(12) United States Patent
Behnia et al.

(10) Patent No.: US 9,157,421 B2
(45) Date of Patent: Oct. 13, 2015

(54) ROADWAY ENERGY HARVESTING SYSTEM

(75) Inventors: Ladan Behnia, Beverly Hills, CA (US); Alireza Yazdanshenas, San Juan Capistrano, CA (US)

(73) Assignee: ABC Nationwide, Inc., Anaheim, CA (US)

( * ) Notice: Subject to any disclaimer, the term of this patent is extended or adjusted under 35 U.S.C. 154(b) by 0 days.

(21) Appl. No.: 13/446,742

(22) Filed: Apr. 13, 2012

(65) Prior Publication Data

US 2013/0009398 A1    Jan. 10, 2013

Related U.S. Application Data

(60) Provisional application No. 61/475,089, filed on Apr. 13, 2011, provisional application No. 61/576,189, filed on Dec. 15, 2011.

(51) Int. Cl.
*F01D 15/10* (2006.01)
*F03G 7/08* (2006.01)

(52) U.S. Cl.
CPC . *F03G 7/08* (2013.01); *Y02B 10/30* (2013.01); *Y02B 10/70* (2013.01)

(58) Field of Classification Search
USPC .......................................................... 290/52
IPC ............. F01K 25/00,25/02; F03B 13/00, 13/08, F03B 17/11, 17/005, 17/02, 17/025, 17/04, F03B 17/06
See application file for complete search history.

(56) References Cited

U.S. PATENT DOCUMENTS

| | | |
|---|---|---|
| 1,771,200 A | 7/1930 | Akers |
| 3,885,163 A | 5/1975 | Toberman |
| 4,081,224 A | 3/1978 | Krupp |
| 4,173,431 A | 11/1979 | Smith |
| 4,409,489 A | 10/1983 | Hayes |
| 4,418,542 A | 12/1983 | Ferrell |
| 6,091,159 A | 7/2000 | Galich |
| 6,172,426 B1 | 1/2001 | Galich |
| 6,182,378 B1 | 2/2001 | Sendaula |
| 6,376,925 B1 | 4/2002 | Galich |
| 6,718,760 B1 | 4/2004 | Padera |
| 6,949,840 B2 | 9/2005 | Ricketts |

(Continued)

FOREIGN PATENT DOCUMENTS

| | | |
|---|---|---|
| EP | 2 065 228 A1 | 6/2009 |
| WO | WO 2010/105284 A1 | 9/2010 |

OTHER PUBLICATIONS

ID TechEx, Energy Harvesting Journal, "Energy harvesting roads in Israel", http://www.energyharvestingjournal.com/articles/energy-harvesting-roads-in-israel, Aug. 4, 2009, 2 pages.

(Continued)

*Primary Examiner* — Vanessa Girardi
(74) *Attorney, Agent, or Firm* — Christensen Fonder P.A.

(57) ABSTRACT

A system of efficiently and safely generating and storing energy from the weight and motion of a moving vehicle across a roadway. It is a object of the present invention to transform energy in the form of pressure, weight, or movement, for example, produced by moving vehicles into air pressure, store it, and subsequently convert the energy into the type of usable energy typically desired by cities, municipalities or private entities. In an embodiment, pressurized air is utilized. In another embodiment, magnetoelectric energy is utilized.

8 Claims, 4 Drawing Sheets

(56) References Cited

U.S. PATENT DOCUMENTS

| | | |
|---|---|---|
| 2006/0059937 A1* | 3/2006 | Perkins et al. ............... 62/259.2 |
| 2008/0127510 A1 | 6/2008 | Yang |
| 2010/0006362 A1 | 1/2010 | Armstrong |
| 2010/0045111 A1 | 2/2010 | Abramovich et al. |
| 2010/0072758 A1 | 3/2010 | Chang et al. |
| 2010/0219798 A1 | 9/2010 | Namuduri et al. |

OTHER PUBLICATIONS

ID TechEx, Energy Harvesting Journal, "Harvesting energy from moving vehicles", http://wwww.energyharvestingjournal.com/articles/harvesting-energy-from-moving-vehicle, May 5, 2009, 2 pages.

MotionPower™, New Energy Technologies Inc., "Motion Power" http://www.newenergytechnologiesinc.com/motion_power, 2010, 2 pages.

MotionPower™—Heavy, New Energy Technologies Inc., "Motion Power—Heavy", http://www.newnergytechnologiesinc.com/motionpower_heavy, 2010, 2 pages.

MotionPower™—Auto, New Energy Technologies Inc., "Motion Power—Auto", http://www.newenergytechnologiesinc.com/motionpower_auto, 2010, 2 pages.

Energy Harvesting Journal, "Harvesting the energy of traffic flow", http://www.energyharvestingjournal.com/articles/harvesting-the-energy-of-traffic-flow . . . , Jul. 19, 2010, 2 pages.

Energy Harvesting Journal, "AdaptivEnergy and GainSpan Announce Technology Development Partnership", http://www.energyharvestingjournal.com/articles/adaptiveenergy-and-gainspan-announce . . . , Nov. 5, 2009, 2 pages.

PCT International Search Report for International Application No. PCT/US2012/033536, 3 pages.

PCT International Written Opinion for International Application No. PCT/US2012/033536, 4 pages.

* cited by examiner

ROADWAY ENERGY HARVESTING SYSTEM

RELATED APPLICATION

The present application claims the benefit of U.S. Provisional Application No. 61/475,089, filed Apr. 13, 2011, and claims the benefit of U.S. Provisional Application No. 61/576,189, filed Dec. 15, 2011, both of which are incorporated herein in their entirety by reference.

TECHNICAL FIELD

The present invention relates to energy generation and storage. More particularly, it relates to the generation of energy and subsequent storage of that energy from the motion and weight of a moving vehicle.

BACKGROUND OF THE INVENTION

As traditional fossil fuels and other hydrocarbon-based energy sources become more scarce and, in turn, more costly, a wave of alternative energy ideas have been devised. However, generally because of cost and complexity concerns, these ideas are rarely implemented. Often, cities and municipalities, the very institutions struggling the most with energy costs, are in the best position to create and harness alternative energy.

As such, one untapped resource for alternative energy generation and storage exists in the form of the energy stored by the millions of moving vehicles traveling the world's highways every day. The kinetic energy of each moving vehicle is the energy which the vehicle possesses due to its motion. The work required to accelerate a particular vehicle with a particular mass from rest to a particular velocity precisely defines the kinetic energy of that vehicle. It takes little explanation to emphasize the sheer number of cars and, thus, the sheer amount of mass and (if harnessed) potential energy moving about the world's highways every day. Capturing even a small percentage of this energy would be a boon to relieve the stress on traditional energy sources.

Systems for capturing kinetic energy from a moving vehicle have been described in the art. Many of these systems utilize motioned mechanical or direct hydraulic means for harnessing and then transferring the energy. In general, these systems suffer disadvantages. Mechanical arrangements create large variations in the road bed surface which cause a bumpy ride and uncomfortable sensation in the overpassing vehicle. Direct hydraulic mechanisms often operate without a storage tank, and further, require some type of hydraulic fluid to be passed throughout the system.

Additionally, any storage of the harnessed energy, if even contemplated by the prior art, is often inefficient and subject to energy loss. Thus, there is a need for an efficient and cost-effective method of creating and storing alternatively-created energy.

SUMMARY OF THE INVENTION

The device of the present application substantially meets the aforementioned needs of the industry. In accordance with the present invention, there is provided a system of efficiently and safely generating and storing energy from the weight and motion of a moving vehicle across a roadway. In an embodiment, it is a object of the present invention to transform energy in the form of pressure, weight, or movement, for example, produced by moving vehicles into air pressure, store it, and subsequently convert the energy into the type of usable energy typically desired by cities, municipalities or private entities.

In another embodiment, it is an object of the present invention to transform energy in the form of movement, for example, produced by moving vehicles into magnetoelectric energy, store it, and subsequently convert the energy into the type of usable energy typically desired by cities, municipalities or private entities.

In embodiments of the present invention, a roadway energy harvesting system generally comprises a vehicle interface like air pistons, balloons, or flexible piping, as well as air collection piping, a pressure tank, an air turbine, and a generator.

In other embodiments of the present invention, a roadway energy harvesting system generally comprises a vehicle interface like CPVC interface plates, a magnetoelectricity converter, and a battery.

A feature and advantage of embodiments of the invention is that the interface to the moving vehicles is minimally invasive, thus providing a smooth ride and little, if any, disturbance to the vehicle and passengers. In embodiments of the invention, the air pistons, flexible piping, or balloons that provide the interface to the vehicle do not require the substantial mechanical movement as the vehicle interfaces of the prior art. In other embodiments, CPVC interface plates likewise do not require the substantial mechanical movement as the vehicle interfaces of the prior art. The interfaces contemplated by the present invention all utilize compressed air instead of the rigid mechanical movement of the prior art.

A feature and advantage of embodiments of the invention is that the components of the invention can be placed above-ground or underground. Similarly, a plurality of components can be placed above-ground, while others are placed underground. Because of the flexibility afforded by the embodiments, the present invention is useful for a wide variety of uses. For example, a city with already-constructed roads wishing to avoid the cost of tearing up the roads can implement the present invention with all of the components substantially on top of existing roads, without expensive digging and repair. Conversely, a city with to-be-constructed roads can implement the present invention with all of the components substantially underneath the roads prior to road construction, thus preserving valuable above-ground space, yet gaining the benefits of the invention. Still alternatively, some components can be placed above-ground where appropriate, and some can be placed underground, where appropriate.

A feature and advantage of embodiments of the invention is that the components of the invention are portable. Because the interface to the moving vehicles does not need to be integrated into the roadway itself—it can be placed on top of existing roads—and the other components are of relatively small size and in discrete pieces, the entire roadway energy harvesting system is easily moved. Further, because no hydraulic fluid is used, there are no worries about uncoupling the various components—for example, in embodiments utilizing pressurized air, only air will escape, and it does not need to be replaced. This movability aids in not only initial installation, but in potential operational advantages. For example, it would be advantageous for a city that has implemented an embodiment of the present invention to implement the invention on that city's on-average most-traveled roadway. By doing so, the city could harvest and store the maximum amount of energy. However, while a particular roadway may average the most vehicles traveled, special one-time or unique events may provide opportunities for the implementing city to transport the roadway energy harvesting system to a roadway that, on average, has fewer vehicles, but will be known to be traveled on by a large number of vehicles on a particular day. For instance, a sporting event that will attract 50,000 people will inevitably require some 30,000 vehicles traveling to the sporting event along one or two major roads. Thus, there exists a great opportunity for the harvesting of energy where a known one-time or unique event will draw a large number of vehicles. By transporting the roadway energy harvesting system to the one or two major roads near the event, this energy can be harvested. It is even contemplated that the energy harvested by the roadway energy harvesting system could be utilized to power the various energy requirements of the event.

A feature and advantage of embodiments of the invention is that no hydraulic liquid is required. Not only is a system lacking hydraulic fluid simpler, but it is also safer. Hydraulic systems often operate at high PSI and temperatures that can reach hundreds of degrees Celsius. Thus, severe injuries can result from component failures; care must be used when performing maintenance or handling hydraulic systems. Further, hydraulic fluids can contain a wide range of chemical compounds, which are often hazardous. Additionally, incorporating specialized fluids with fire resistant characteristics increase cost and complexity.

A feature and advantage of embodiments of the invention is that the energy harvested is efficiently storable. In embodiments where pressurized air is utilized, and thus because air is compressible, a pressure tank is utilized to build air pressure. Leak-free couplers ensure that the air pressure harvested remains effectively within the system. In embodiments where magnetoelectric energy is utilized, it is likewise efficiently stored in efficient batteries of the art.

A feature and advantage of embodiments of the invention is that it puts cities and municipalities, the entities that generally control the streets but that also often have budget or energy shortfalls, in an ideal position to harvest energy. These entities can transfer the captured energy to city or municipal buildings, or feed the captured energy back into the general energy grid for the city or municipality's citizens.

Also contemplated is a business method whereby cities or municipal entities lease the roadway energy harvesting system of the present invention. For example, in the case of a city with an energy shortfall, but no money to outright purchase and install the system of the present invention, it would be useful for said city to lease the energy harvesting system of the present invention for a period of time until the energy shortfall has been abated. Similarly, in the case of a city hosting a one-time event that will draw a large number of vehicles, it would be useful for the energy harvesting system of the present invention to be leased to the city for only the period of time required to capture the energy of the vehicles attending the event. Thus, the business method of leasing the roadway energy harvesting system of the present invention can be extremely beneficial to cities and municipalities, as well as the leasing entity.

BRIEF DESCRIPTION OF THE DRAWINGS

The invention may be more completely understood in consideration of the following detailed description of various embodiments of the invention, in connection with the accompanying drawings, in which.

Figure 1A:
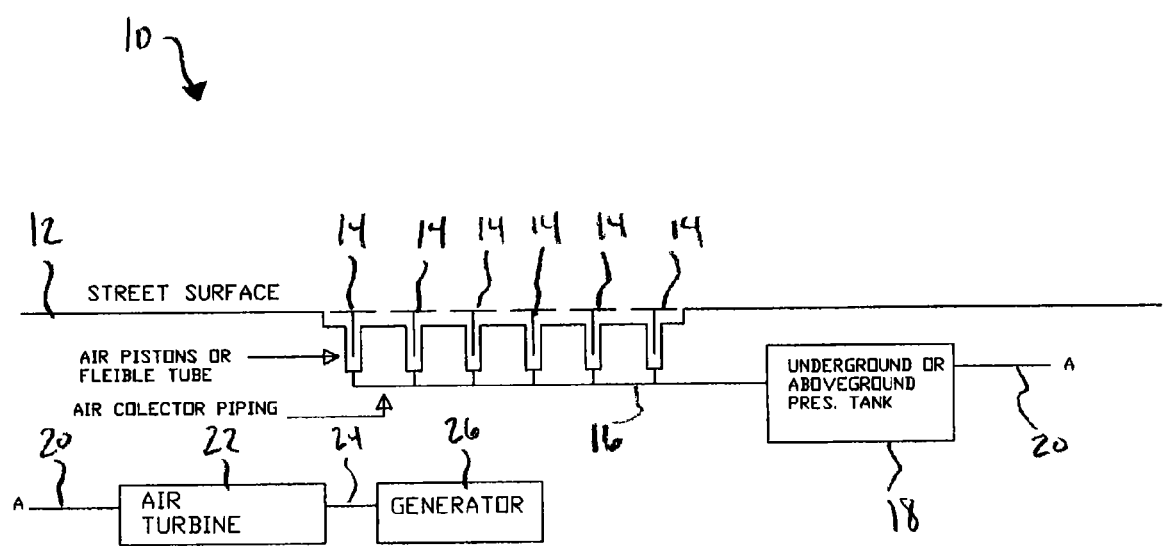
FIG. 1A is a diagram of a roadway energy harvesting system utilizing air pressure, according to an embodiment of the invention.

While the invention is amenable to various modifications and alternative forms, specifics thereof have by shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to FIG. 1A, according to an embodiment of the invention, a roadway energy harvesting system 10 is illustrated. A roadway energy harvesting system 10 generally comprises a vehicle interface 14, air collection piping 16, a pressure tank 18, an air turbine 22, and a generator 26.

Vehicle interface 14 is implemented coplanar and immediately adjacent to street surface 12. As illustrated in FIG. 1A, vehicle interface 14 can comprise air pistons or flexible tubing, but can also comprise inflatable balloons, or any other interfacing structure or device that readily interfaces with the tires of a moving vehicle.

Air collection piping 16 connects the harvesting mechanism of vehicle interface 14 to pressure tank 18. Air collection piping 16 implements valves such that air moves in a desired direction and is not lost back through vehicle interfaces 14. Air collection piping 16 can be made from many different materials. In one embodiment, air collection piping 16 is substantially rigid and made from materials like copper, aluminum, stainless steel, or carbon steel. In environments where piping integrity may be compromised due to harsh conditions, rigid, durable piping may be desired. In another embodiment, plastic piping may be used, like for example, flexible nylon tubing. Caution must be used to ensure that ultraviolet light and any coupling or lubrication materials are compatible with the type of pipe chosen.

In an embodiment of the present invention, a single air collection pipe 16 is operably coupled to the plurality of vehicle interfaces 14. In an alternate embodiment, a plurality of air collection pipes 16 are utilized such that every vehicle interface 14 is connected to a unique air collection pipe 16 in a one-to-one relationship. In still an alternate embodiment, a plurality of air collection pipes 16 are utilized such that a plurality of vehicle interfaces 14, but not all of vehicle interfaces 14, are connected to a single air collection pipe 16 in a one-to-many relationship. For example, for various efficiency or relative placement reasons, three individual vehicle interfaces 14 may be operably coupled to a first air collection pipe 14, and the three remaining individual vehicle interfaces 14 may be operably coupled to a second air collection pipe 14.

Air collection piping 16 is operably coupled to pressure tank 18 to form an air input. Pressure tank 18 generally comprises an airtight housing and structure defining apertures in which valves can be received. Valves on pressure tank 18 control the buildup and subsequent release of air. Because the compressed air is a source of energy, it can be stored inside the housing of pressure tank 18 until it is utilized. During compression, the molecules in the air within the housing of pressure tank 18 speed up, which actually creates the energy source. When appropriate, the compressed air molecules are released via the pressure tank 18 valves.

Tubing 20 is operably coupled to pressure tank 18 to form an air output from pressure tank 18. Tubing 20 is comprised of the same materials as described above for air collection pipe 16. The opposite end of tubing 20 from pressure tank 18 is operably coupled to air turbine 22.

Air turbine 22 can comprise a traditional wind turbine where blades or an exterior surface receives the pressurized air to generate mechanical movement. Working in combination with generator 26 along connection 24, such a device therefore converts kinetic energy from the pressurized air into mechanical energy. A variety of efficient vertical axis or horizontal axis interfaces are contemplated. In another embodiment, air turbine 22 may comprise an air-powered engine. In such an embodiment, working similarly in combination with generator 26 along connection 24, the kinetic energy of the pressurized air is converted into mechanical energy. A pneumatic motor or compressed air engine converts the compressed air to mechanical work through linear or rotary motion. Generally, linear motion can be derived from, for example, a diaphragm or piston actuator. Rotary motion can be derived from a vane-type air motor or piston air motor, for example. Generator 26 flows the mechanical energy through an electrical circuit to create electrical energy.

Optionally, air pressure regulators (not shown) can be utilized along any portion of system 10 in order to control the pressure in the air lines or any component. Air pressure regulators can remove fluctuations within system 10 and maintain consistent pressure where desired.

System 10 is operably coupled with a power grid or sink (not shown) that is able to receive electrical energy and use the energy to power electrical devices. Optionally, system 10 may be operably coupled to a battery (not shown) such that the electrical energy created by system 10 can be stored and used at a later time. System 10 therefore provides an efficient means for storing both the kinetic energy stored in pressure tank 18, but the electrical energy stored in a battery.

Figure 1B:
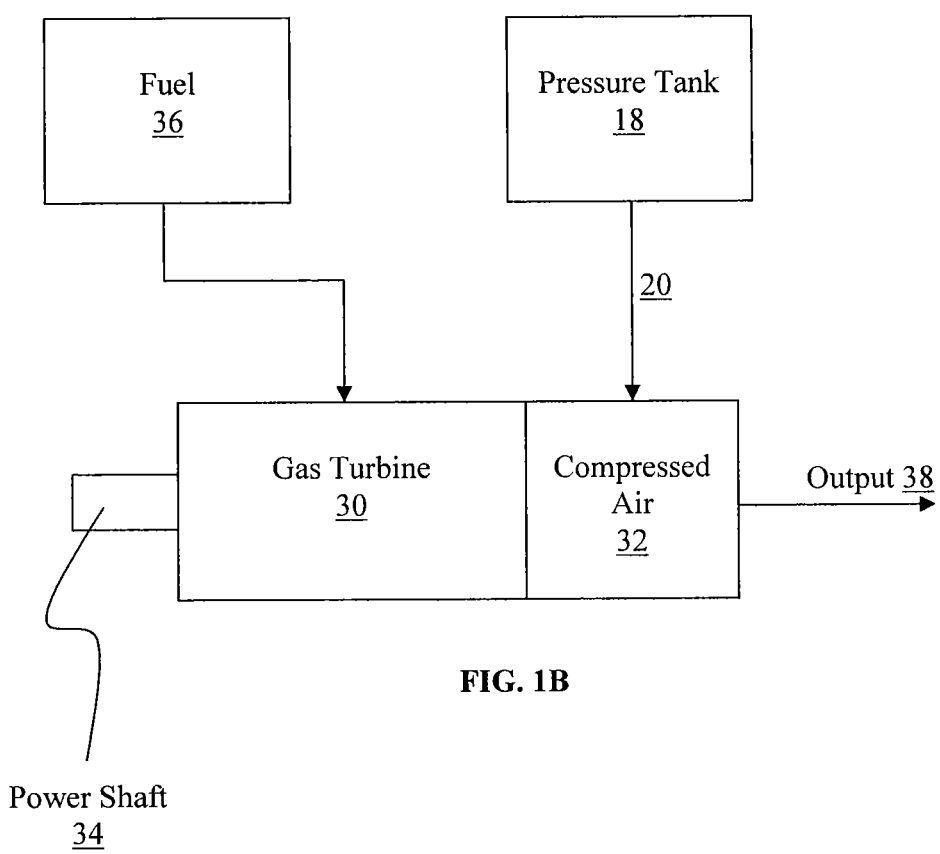
FIG. 1B is a diagram of a roadway energy harvesting system utilizing a gas turbine as a component of an output module, according to an embodiment of the invention.

In another embodiment, referring to FIG. 1B, system 10 further comprises gas turbine 30. Gas turbine 30 is an internal combustion engine and comprises compressed air chamber 32 and power shaft 34. System 10 therefore further comprises fuel input 36 and gas turbine output 38, in embodiments. Compressed air chamber 32 is configured to store compressed air for use in the combustion process or to do other work. High pressure air of air chamber 32 is utilized to increase the temperature of the combustion. Power shaft 34, in an embodiment, comprises a shaft moved as part of the mechanical output from gas turbine 30. In embodiments, power shaft 34 can comprise any type of shaft 34, such as turbine blades, spools, or crankshaft, for example. Fuel input 36 provides the fuel for combustion of the gas turbine 30. Gas turbine output 38 therefore comprises any output including power shaft 34 power, or compressed air, thrust, or any other energy output. Energy can therefore be extracted via output 38 in the form of power shaft 34 power, compressed air, thrust, or any combination thereof. In embodiments of system 10 incorporating gas turbine 30, pressure tank 18 is operably coupled via tubing 20 to compressed air chamber 32 in order to increase the efficiency of gas turbine 30, as is described below.

Traditional gas turbines, on their own, are quite inefficient. Often, the energy waste is up to 60%. In embodiments of the invention, coupling system 10 to gas turbine 30 provides increased efficiency for gas turbine 30. Reduced operating cost of the gas turbine 30 is realized in the form of decreased fuel costs, lower run time, and reduced heat waste. When coupled to pressure tank 18, the compressed air tank 32 is supplemented such that the output 38 of gas turbine 30 can be efficiently extracted elsewhere.

In operation, system 10 is installed such that vehicle interfaces 14 reside on a road surface. Air collection piping 16, pressure tank 18, air turbine 22, and generator 26, and all interconnects are installed adjacent the street surface 12. As illustrated in FIG. 1A, all of the components besides vehicle interface 14 may be enclosed underground. Alternatively in another embodiment, and not shown, all of the components besides vehicle interface 14 may be positioned above-ground. In still another embodiment, and not shown, some components may be positioned above-ground and others may be positioned underground.

Vehicles move along street surface 12 to interface with vehicle interface 14. Air pistons, flexible tubing, or inflated balloons are compressed by the moving vehicle at vehicle interface 14 to create pressurized air. The pressurized air travels from vehicle interface 14 to air collection piping 16, where valves ensure the air travels in the direction intended, to pressure tank 18. Once air is sufficiently pressurized in pressure tank 18, the air is released along tubing 20 such that it interfaces with air turbine 22 or an air-powered engine. The pressurized air forces the blades or receiving surface of air turbine 22 to generate mechanical movement. In combination with generator 26 along connection 24, the mechanical movement of air turbine 22 is transferred into electrical energy. Finally, a power grid or sink receives the newly-created electrical energy and uses the energy to power electrical devices.

Referring to the embodiment depicted in FIG. 1B, gas turbine 30 operates by adding energy via fuel input 36 to the gas stream created by compressed air tank 32. Fuel input 36 is mixed with air and ignited in the combustor of gas turbine 30. The products of the combustion are forced into the turbine portion of gas turbine 30, such that the gas flow is directed to power shaft 34, spinning power shaft 34 and thereby generating mechanical energy. As described above, this mechanical energy or power shaft 34 power, or alternatively, compressed air or thrust can be output an utilized elsewhere, and in combination with the power grid or power sink described above and configured to receive the newly-created electrical energy in order to power electrical devices. The energy given to the turbine is a result of the reduction in temperature and pressure of the exhaust gas. When coupled to system 10 and specifically, pressure tank 18 via tubing 20, the compressed air stored by pressure tank 18 supplements the compressed air of compressed air tank 32 of gas turbine 30. The air stored by pressure tank 18 can be configured to efficiently aid the combustion of the fuel and air within gas turbine 30 such that the energy lost from the compressed air tank 32 via the exhaust gas is substantially reduced.

Figure 2:
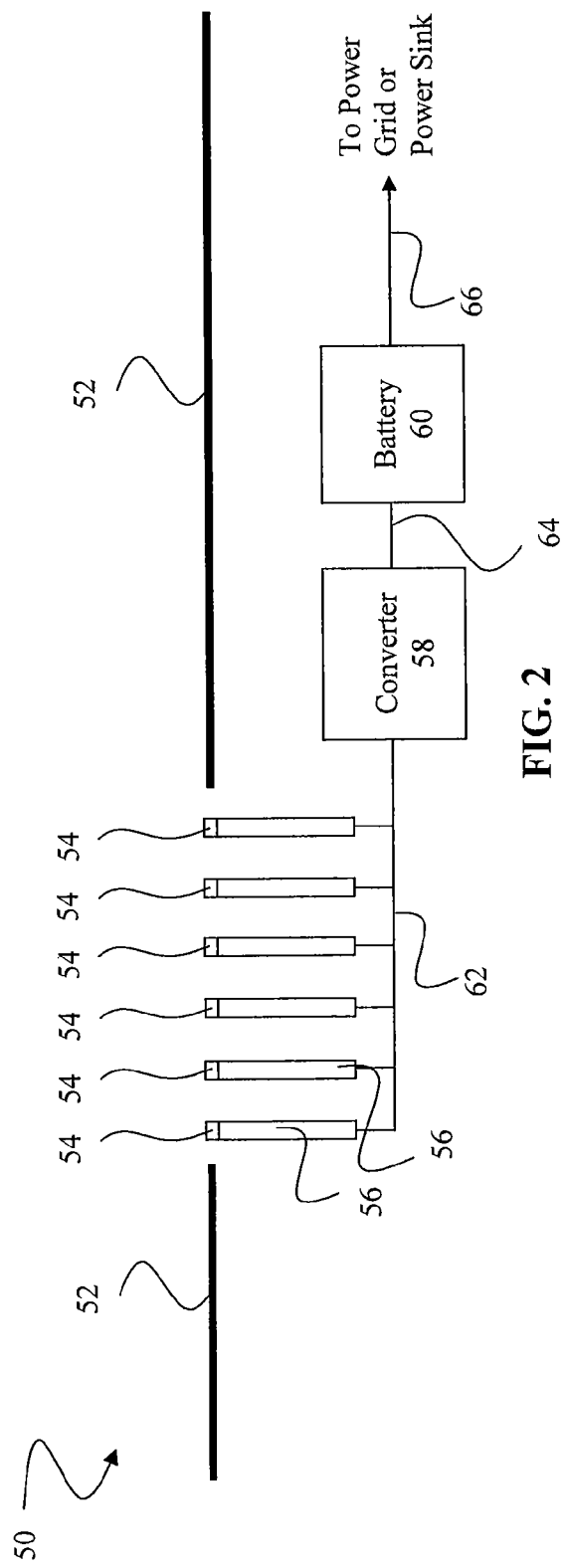
FIG. 2 is a diagram of a roadway energy harvesting system utilizing electromagnetic elements, according to an embodiment of the invention.

In another embodiment, referring to FIG. 2, a roadway energy harvesting system 50 is illustrated. A roadway energy harvesting system 50 generally comprises vehicle interface 54, at least one magnetoelectric element 56, converter 58, and battery 60. Portions of energy harvesting system 50 can be installed within street surface 52.

Vehicle interface 54 is implemented coplanar and immediately adjacent to street surface 52. As illustrated in FIG. 2, vehicle interface 54 can comprise CPVC coverings having anti-skid flexible material that envelop each of magnetoelectric elements 56. In other embodiments, vehicle interface 54 can be any interfacing structure or device that readily interfaces with the tires of a moving vehicle.

Figure 3:
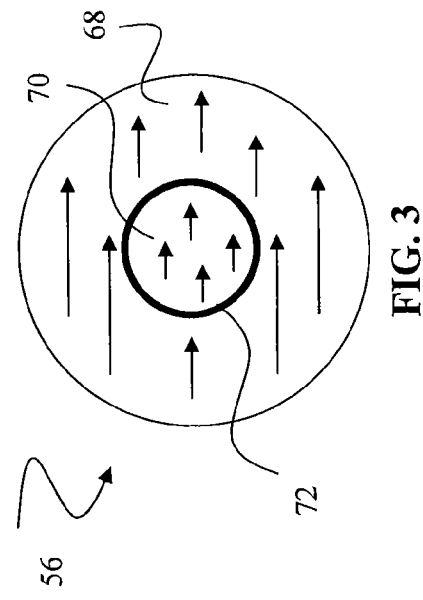
FIG. 3 is a top view of an electromagnetic element of FIG. 2, according to an embodiment.

At least one magnetoelectric element 56 is coupled to vehicle interface 54. In an embodiment, magnetoelectrical elements 56 are installed under street surface 52 and covered with CPVC having anti-skid flexible material. For example, an existing street surface 52 can be excavated two feet wide and eighteen inches deep such that magnetoelectrical elements 56 can be installed within street surface 52. Referring to FIG. 3, magnetoelectric element 56 can comprise a series of adjacent magnets coupled to a spring. In an embodiment, magnetoelectric element 56 comprises outer magnet 68, inner magnet 70, and spring 72.

In an embodiment, outer magnet 68 comprises a donut-shaped circle having an aperture in the center. Outer magnet 68 has a magnetic field configured in a first direction, as indicated by the arrows in FIG. 3. Inner magnet 70 is positioned inside the aperture of outer magnet 68. Inner magnet 68 has a magnetic field configured in the same first direction as the magnetic field of outer magnet 68. Outer magnet 68 and inner magnet 70 are coupled together by spring 72. Spring 72 is positioned on the outer surface of inner magnet 70 and on the inner surface of the aperture of outer magnet 68. Because inner magnet 70 and outer magnet 68 have the same magnetic fields, inner magnet 70 is repelled and projects toward street surface 52 from outer magnet 68 when in a non-compressed position. In another embodiment, outer magnet 68 projects toward street surface 52 from inner magnet 70 when in a non-compressed position. The movement of inner magnet 70 with respect to outer magnet 68 creates an electrical field.

Figure 4:
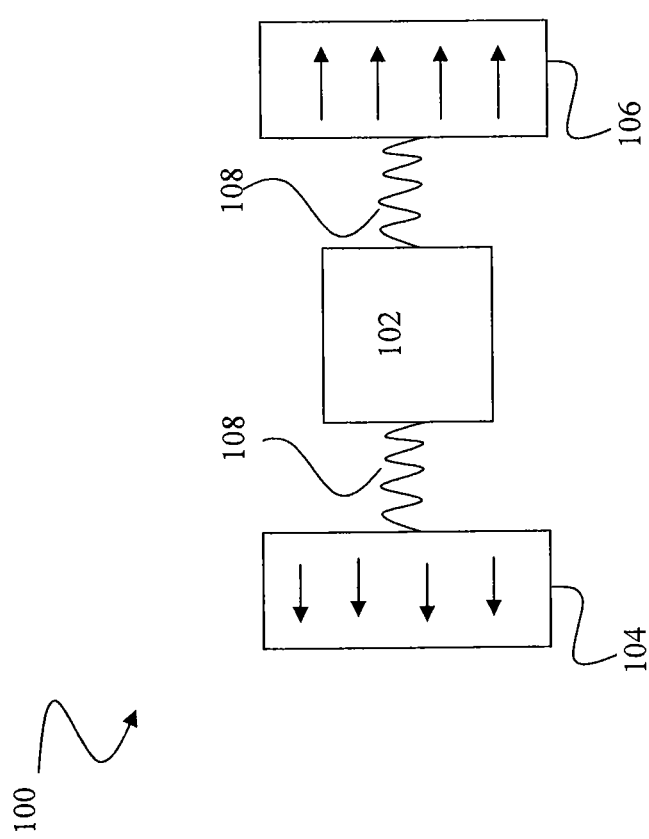
FIG. 4 is a side view of an electromagnetic element of FIG. 2, according to an embodiment.

In another embodiment, referring to FIG. 4, magnetoelectric element 100 comprises a center portion 102, a first magnetized side 104, a second magnetized side 106, and springs 108.

Center portion 102 is coupled to first magnetized side 104 via a first spring 108 on a first side. First magnetized side 104 has a magnetic field configured in a first direction, as indicated by the arrows in FIG. 4. Center portion 102 is coupled to second magnetized side 106 via a second spring 108 on a second side. Second magnetized side 106 has a magnetic field configured in a second direction opposite to the magnetic field of the first direction, as indicated by the arrows in FIG. 4. The movement of first magnetized side 104 with respect to second magnetized side 106 creates an electrical field.

Referring again to FIG. 2, electrical line 62 is configured to receive the electric pulses generated by the at least one magnetoelectric element 56, in an embodiment, or magnetoelectric element 100 in another embodiment. The embodiments of magnetoelectric element 56 within system 50 may be all of the same type (for example, all of the type of the embodiment depicted in FIG. 3, or all of the type of the embodiment depicted in FIG. 4), or a combination of types. The electric field-creating magnetization embodiments are not limited to those described herein.

Converter 58 is configured to receive the electric pulses from magnetoelectric elements 56 or 100 and output kilovolt alternating current (KV/AC). The electric pulses are received from electrical line 62 and output onto electrical line 64 after conversion by converter 58.

Battery 60 allows for the electrical energy created by system 50 to be stored and used at a later time. Electrical energy is received by battery 60 from converter 58 along electrical line 64. System 50 is operably coupled with a power grid or sink that is able to receive electrical energy and use the energy to power electrical devices. System 50 therefore provides an efficient means for storing electrical energy, in addition to the efficient creation of electrical energy from mechanical energy.

In operation, system 50 is installed such that vehicle interfaces 54 reside on a road surface 52. Magnetoelectric elements 56, converter 58, battery 60, and all interconnects are installed adjacent the street surface 52. As illustrated in FIG. 2, all of the components besides vehicle interface 54 may be enclosed underground. Alternatively in another embodiment, and not shown, all of the components besides vehicle interface 54 may be positioned above-ground. In still another embodiment, and not shown, some components may be positioned above-ground and others may be positioned underground.

Vehicles move along street surface 52 to interface with vehicle interface 54. Magnetoelectric elements 56 or 100 are compressed by the moving vehicle at vehicle interface 54 to mechanical movement.

In the embodiment depicted in FIG. 3, referring to magnetoelectric element 56, when vehicle interface 54 is compressed, inner magnet 70 is likewise compressed inside the aperture of outer magnet 68. The motion of the magnets and their respective magnetic fields creates electrical pulses of an electrical field. In another configuration of this embodiment, outer magnet 68 is compressed along inner magnet 70.

In the embodiment depicted in FIG. 4, referring to magnetoelectric element 100, when vehicle interface 54 is compressed, center portion 102 is likewise compressed. The retention of springs 108 on either side of center portion 102 causes first magnetized side 104 and second magnetized side 106 to move relative to each other. The subsequent oscillation of first magnetized side 104 having a magnetic field configured in a first direction relative second magnetized side 106 having a magnetic field configured in an opposing second direction creates electrical pulses of an electrical field.

The electrical pulses created by the electrical field are transferred along electrical line 62 to converter 58. Converter 58 receives the electrical pulses of the electrical field and outputs kilovolt alternating current. In an embodiment, 6 KV/AC is output. Converter 58 outputs the appropriate alternating current or other electrical energy along electrical line 64 in the direction of battery 60.

Battery 60 receives the generated electrical energy from electrical line 64 and appropriately stores the energy. In an embodiment, the energy is passed immediately without storage. After subsequent storage (or immediate transfer, if desired) electrical energy is output from battery 60 to the power grid or power sink capable of using the energy along electrical line 66.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A system for roadway energy harvesting, the roadway having a surface adapted to support one or more moving vehicles, the system comprising:
    a single-fluid vehicle interface positioned proximate the roadway surface and adapted to engage a portion of a moving vehicle, the vehicle interface comprising movable air-compression units, each and every one of the movable air-compression units configured to compress the single fluid, the single fluid being air, each of the movable air-compression units configured to compress air independently of the actuation of the other movable air-compression units;
    a storage module configured to receive and store the compressed air received from the vehicle interface, the storage module including a compressed air input and a compressed air output, the compressed air input distinct and separate from the compressed air output;
    a transfer module operably coupling the at least one vehicle interface and the storage device at the compressed air output, the transfer module comprising air-collection piping having a valve, the valve configured to allow flow of compressed air from the at least one vehicle interface to the storage module and to prevent compressed air from flowing back from the storage module to the at least one vehicle interface; and
    an output module operably coupled to the compressed air output of the storage module and configured to receive the compressed air stored in the storage module and use the compressed air to generate energy
    wherein the vehicle interface, storage module and transfer module comprise an open-system configuration whereby air to be compressed by the vehicle interface is received from an environment about the air collection piping, and after compression flows from the vehicle interface by way of the transfer module to the storage module then to the output module, without returning to the air collection piping or storage module.

2. The system of claim 1, wherein the output module comprises a gas or air turbine, wherein the gas or air turbine is configured to receive the compressed air and apply the compressed air to a gas or air turbine need.

3. The system of claim 1, wherein the movable air-compression units comprise air pistons.

4. The system of claim 1, wherein the storage module comprises a pressure tank and the air-collection piping comprises flexible tubing.

5. The system of claim 4, wherein the output module further comprises an air turbine or air-powered engine and a generator, wherein the air turbine or air-powered engine are configured to receive the compressed air and output mechanical movement, and the generator is configured to flow the mechanical movement through an electrical circuit to create electrical energy.

6. The system of claim 4, further comprising a plurality of air pressure regulators configured to control the air pressure of the system.

7. A method for roadway energy harvesting on a roadway having a surface adapted to support one or more moving vehicles, each of the moving vehicles having a portion for contacting the roadway surface, the method comprising:
    receiving the portion of the vehicle via at least one vehicle interface, the at least one vehicle interface comprising a plurality of movable air-compression units positioned proximate the roadway surface and adapted to interface with the portion of the vehicle for contacting the roadway surface each and every one of the plurality of movable air-compression units configured to compress a single fluid, the single fluid being air, each of the movable air-compression units configured to compress air independently of the actuation of the other movable air-compression units, at least one of the movable air-compression units being actuated by the portion of the vehicle, thereby compressing air;
    transferring the compressed air to a storage module via a transfer module comprising air-collection piping having a valve, the valve configured to allow flow of compressed air from the at least one vehicle interface to the storage module and to prevent compressed air from flowing back from the storage module to the at least one vehicle interface; wherein
    the vehicle interface, transfer module, and storage module comprise an open system storing the compressed air in the storage module; and
    outputting the compressed air stored and applying the compressed air to an energy need.

8. The method of claim 7, wherein the at least one movable air-compression units compressing air comprises an air piston being actuated by the portion of the vehicle.

* * * * *